Nov. 21, 1967 C. E. MACON ETAL 3,354,429

DATA PROCESSOR

Filed Feb. 18, 1965 4 Sheets-Sheet 1

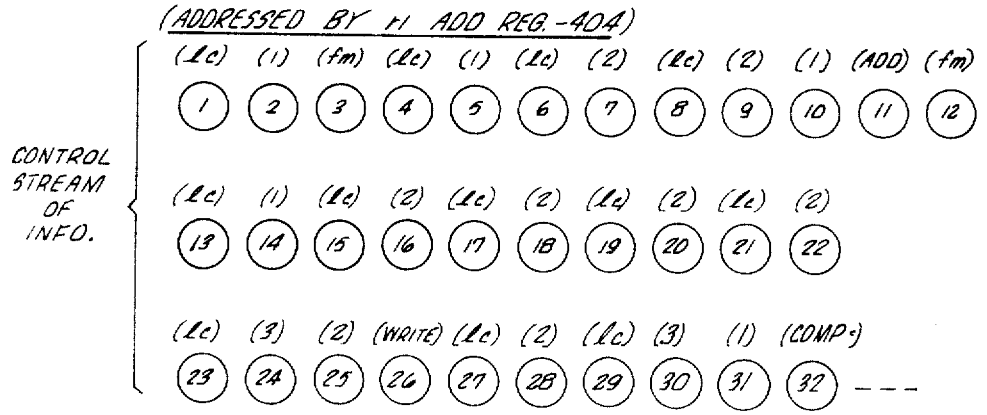
FIG. 5
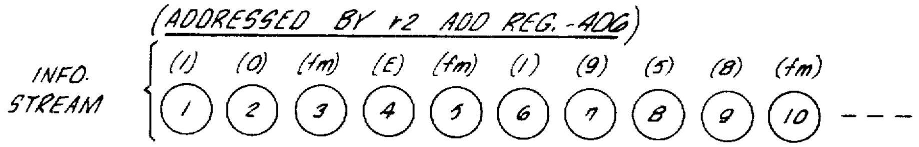
FIG. 6
RESULT OF COMPARISON
| | | | | |
|---|---|---|---|---|
| (1) | Wr>rr (COMP>) | SET FF T | SET FF F | SET FF T (NO FURTHER ACTION) |
| (2) | Wr<rr (COMP<) | SET FF F | SET FF T | SET FF F (NO FURTHER ACTION) |
| (3) | Wr=rr COMP= | NO ACTION | NO ACTION | SET FF T |
LOGICAL TABLE FOR COMPARE & GATING CIRCUIT-298
FIG. 3

United States Patent Office 3,354,429
Patented Nov. 21, 1967

3,354,429
DATA PROCESSOR
Charles E. Macon, Altadena, Robert S. Barton, Pasadena, Paul A. Quantz, Thousand Oaks, and George T. Shimabukuro, Monterey Park, Calif., assignors to Burroughs Corporation, Detroit, Mich., a corporation of Michigan
Filed Feb. 18, 1965, Ser. No. 433,657
19 Claims. (Cl. 340—172.5)

ABSTRACT OF THE DISCLOSURE

A data processing system having a main data processor and two tape transports in which information is continuously read from one tape transport and written on the other tape transport over a desired period of time. A special processor is coupled in between the tape transports and the main data processor and rapidly processes the information as it is continuously transferred from one tape transport to the other under control of operators received from the main memory of the main data processor.

This invention relates to data processors and, more particularly, to improvements in electronic data processors.

Many times it is desired to process a file of data. For example, in a bank it is necessary to up-date certain balances in a file of bank accounts or in insurance companies it is necessary to up-date information in various files of insureds including such information as marital status of the insured, age of the insured, the extent of coverage, etc.

High speed electronic data processing systems are quite commonly used for storing files of information for banks, insurance companies, etc. and are also used for up-dating the information contained in the files. Generally the files are broken up into records and each record contains a number of different fields of information. Generally it is necessary to process only a very small percentage of the records in a file and of those records which are processed, only a small percentage of the fields in the complete record.

Generally the files are stored on a master magnetic tape and an address is associated with a block of records on tape. If it is desired to up-date, for example, the extent of coverage in one individual's account record, the master tape is first searched until the address is found corresponding to the block having the account and then the complete block of information is read into the main memory of the main data processor. After the complete block of information is stored in the main memory of the main data processor, a second search is made to locate the particular account record and to locate the field within the account record to be up-dated, for example, the field where the insurance coverage for the particular account is stored. This second search is done internally by the main data processor. After the desired field is located within the record, the main data processor modifies the field as desired and then the entire block of information is transferred back from the main memory to a new master tape for storage.

Such an arrangement is undesirable in data processing systems for a number of reasons. First of all a large area of main memory must be reserved just for storing a complete block of information from the tape. Also the main data processor or computer program must be interrupted in order to locate and process the relatively minor up-dating operations in the block of data. Also, time is consumed by the main data processor in for each of the following: reading the block of information from tape, stopping the tape unit while the correct field within the block is searched for, starting the tape unit up again when the desired field of information has been processed and transferring the blocks of information back out from memory to a new tape. An embodiment of the present invention eliminates these time consuming steps.

Aside from the disadvantages of the prior art mentioned above, there are a number of disadvantages applicable in particular to the tape units themselves. For example, the tape units must be started and stopped each time a block of information is read into the processor. Starting and stopping of the tape causes increase wear and tear on the tape transport requiring additional maintenance which would not otherwise be required if the tape transport were started and stopped less frequently. Additionally, the records and fields within the records are generally of fixed length in prior art data processing systems. This is undesirable in that much tape space is wasted. This is caused because some of the records will have less information therein than other records and yet the records are of fixed length. For example, some records will need to carry the name, age, sex, marital status, etc. of four or five dependents, whereas other accounts will have no dependents listed. However, in the prior art, to handle the information in the data processor, each field and record must be of fixed length and hence contain spaces for parts of records which may not be used in the particular record.

The above-mentioned disadvantages are overcome in a data processor embodying the present invention. For example, the need to transfer blocks of information from tape to main memory during the data processing operations is virtually eliminated. It is only necessary to store information into the main memory which is desired to use in the main data processng operations. As a result, the memory space formerly required in the main processor for performing the record processing operations is virtually eliminated. Additionally, files can be processed without interrupting the main data processing programs.

Further, the data processing system embodying the present invention significantly increases the overall speed of up-dating files. The speed is increased by means of a novel arrangement wherein the tape unit reads tape rapidly and continuously record after record and the data being read from the tape is rapidly processed as the information is actually flowing from one tape unit to another. Time need not be taken to start and stop the tape units except in special cases. For example, the tape transports may be stopped at the programmer's option. Such an arrangement provides a very significant increase in reliability of tape transports by significantly reducing the number of starts and stops thereof.

The most significant increase in efficiency of a data processing system embodying the present invention arises in a system where only a small percentage of the total number of records on a tape need be processed and in each record which needs processing only a small percentage of the complete record needs to be processed.

In prior art data processing systems information is located by comparing a desired address with addresses located at the beginning of blocks of information in a file being searched. The present invention utilizes a novel arrangement of delimiters including level control characters for identifying the beginning of each record and field mark characters for separating fields within the records. These field mark delimiters trigger off the flow processing operations and caused data to be processed as it flows from tape to another while both tape transports are continuously operated.

An additional feature of the system embodying the invention is that the records and fields of information can be of varying lengths. Also the need for inter-record gaps is eliminated. Thus, unused space on tape is virtually eliminated. Briefly, a specific embodiment of the present invention has a bulk storage device having a plurality of fields of data stored therein including at least one signal delimiting said fields, the bulk storage device being operative for continuously and sequentially reading out a plurality of the fields. A memory means is provided for storing a plurality of operators and means is provided for causing the memory means to sequentially read out a plurality of the operators simultaneously with and in timed relation to the continuous reading of the fields from the bulk storage device. Means is coupled to the memory means for rapidly processing the fields of data as they are read out of the memory means in accordance with an operator read from the memory means. Also, means is adapted for detecting a predetermined delimiter in the fields and the processing means is coupled to be responsive to such detection for processing a field subsequently read out of the bulk storage device.

These and other features of the present invention may be more fully understood with reference to the following description of the figures of which:

FIG. 3 is a logical table illustrating the operation of the compare and gate circuit shown in FIG. 2;

FIG. 5 shows an example of a program operator stream for use in processing the master stream of data shown in FIG. 4; and FIG. 6 shows an example of the information stream for use with the operator stream shown in FIG. 5 for use in up-dating or processing the master stream of data shown in FIG. 4.

GENERAL DESCRIPTION

Figure 1:
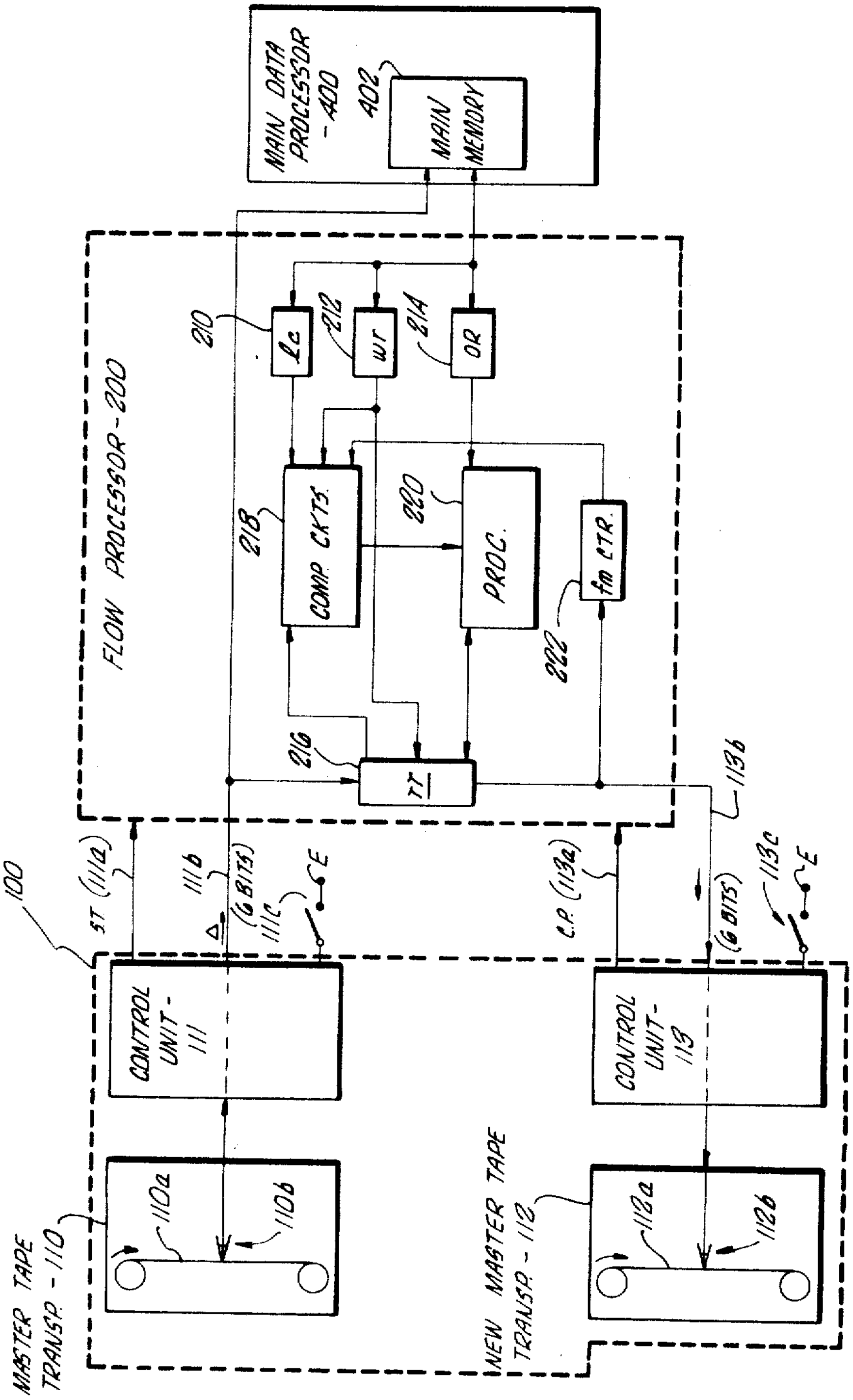
FIG. 1 is a general block diagram of a data processing system embodying the present invention.

Refer now to the general block diagram of the flow processing system shown in FIG. 1 and embodying the present invention. The flow processing system shown in FIG. 1 includes a bulk storage device 100 having a master tape transport 110 and associated therewith a tape control unit 111. The bulk storage device 100 also includes a new master tape transport 112 and associated therewith a tape control unit 113. In the flow processing system of FIG. 1, the master tape transport 110 and 112 are normally operated continuously by the control units 111 and 113. Data read from a master tape **110*a* of the master tape 110 is transferred via a flow processor 200 to a new master tape 112*a* and the transport 112. The master tape transport 110 and the new master tape transport 112 are operated continuously, reading and writing data. While this is taking place, the flow processor 200 is operative for rapidly processing the data flowing therebetween. In this manner data being read from the master tape 110*a* is immediately rewritten on the new master tape 112*a***.

A main data processor 400 is provided for performing normal computations and includes a main memory 402 as a part thereof. The main memory 402 is used for main data processor type operations and, in addition, is time shared with the flow processor 200 as explained in more detail hereinbelow. However, it is not essential to the present invention that the main memory 402 be a part of a main data processor.

Figure 4:
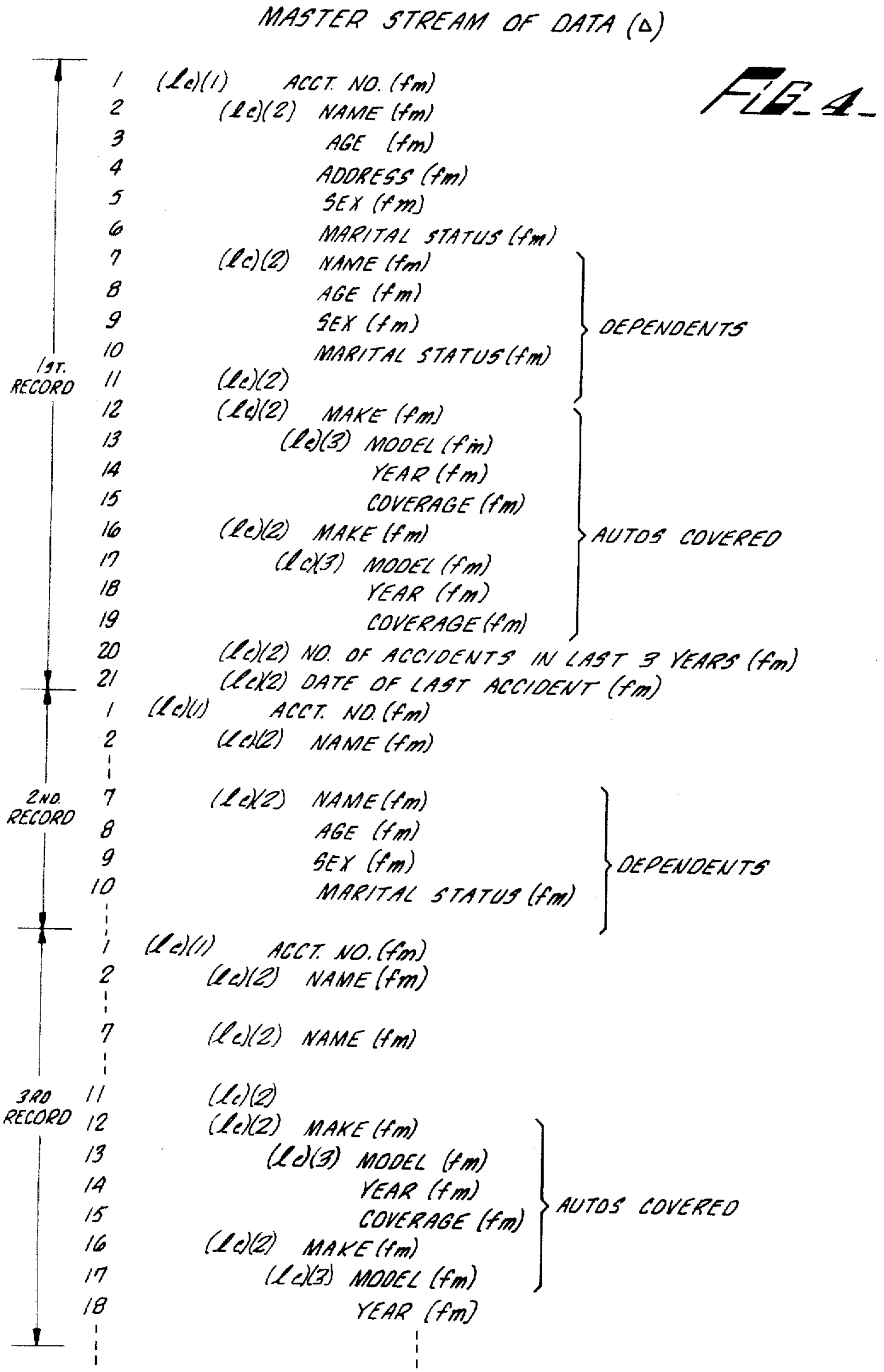
FIG. 4 shows an example of the master stream of data stored on the master tape.

Consider the organization of the files written on the master tape **110*a* of the master tape transport 110. A "master stream of data (Δ)" is stored on the master tape 110*a***. An example of a master stream of data (Δ) for an insurance account is shown in FIG. 4. As indicated, the insurance record file is broken down into a number of different records, each record being delimited by a unique "level control character" represented by the symbol "*lc*." Associated with each such level control character (*lc*) is a numerical character "1" which designates that this is the highest level in the corresponding record and the beginning of the record.

Following each combination of level control character and numerical character [(*lc*)(1)] is a series of fields of data within the corresponding record. The fields are actually composed of one or more characters representing data. By way of example, the insurance account records shown in FIG. 4 are shown including the following data in the following order: account number, policyholder's name, age, address, sex, and marital status; the name, age, sex, and marital status of one dependant; the make, model, year, and insurance coverage for two automobiles of the policyholder; the number of accidents the policyholder has had in the past three years; and the date of the last accident of the policyholder. Only the first record is shown in full, the second and third records being shown partially for purposes of explanation.

Each of the fields of data are delimited by a field mark character represented by the symbol "*fm*." For example, following the account number is the field mark character *fm*. Additionally, each of the records is divided into three different levels delimited by a level control character (*lc*) and the numerals 2 and 3 corresponding to the second and third levels of information within the record. The level control characters (*lc*) and field mark characters (*fm*) are important in the flow processing operations of the flow processor 200, as discussed hereinbelow.

"A control stream of information" is stored in the main memory 402. FIG. 5 shows an example of a control stream which is to be used in processing the master stream of data (Δ) shown in FIG. 4. The control stream instructs the flow processor 200 as to the sequence of operations it must go through to locate and appropriately process and up-date the master stream of data (Δ) flowing from the master tape **110*a* to the new master tape 112*a***. The control stream includes operations such as ADD, READ, WRITE, COMPARE, etc. for specifying the operation to be performed on the master stream of data (Δ). Associated with the repeat operators are delimiters including level control characters (*lc*) and numerical characters and field mark characters (*fm*) which enable the flow processor 200 to locate a desired record and a particular desired field within the record which is to be processed under control of the associated operator.

An "information stream of data" is also stored in the main memory 402 and includes characters specifying the amount by which fields in the master stream of data (Δ) are to be modified and includes other characters used for up-dating information such as characters to be inserted in the master stream of data (Δ).

Consider now the flow processor 200. The flow processor 200 is a separate processor from the main processor 400 but uses to some extent the main memory 402 in the processor 400. The flow processor 200 includes three storage registers 210, 212 and 214 for storing information, one character at a time, from the main memory 402. Also included is an *rr* register 216 for storing the data, flowing from the master tape transport 110 to the new master tape transport 112, character by character.

Consider, briefly, the operation of the system of FIGURE 1. The control stream of information is read out of the main memory 402 character by character. From the control stream of information the level control characters (*lc*) are stored in the *lc* register 210, the level character immediately following a level control character (*lc*) is stored in the *wr* register 212, and the operator characters are stored in the OR register 214.

For purposes of locating data in the master stream of data (Δ), compare circuits 218 are provided for comparing characters stored in the *rr* register 216 with the content of the *lc* register 210 and the *wr* register 212. The compare circuits 218 compare the level control character (*lc*) stored in the *lc* register 210 with the characters in the master stream of data (Δ) as the characters are stored in the *rr* register 216 until a level control character (*lc*) is detected. Right after a level control character (*lc*) is detected in the master stream of data (Δ) the compare circuits 218 start comparing the level characters contained in the *wr* register 212 with characters of the master stream of data (Δ) flowing through register 216. The very next character in the master stream of data (Δ) following the level control character (*lc*), is a level character designating the level of the corresponding level control character. If the numeral following the level control character in the master stream of data (Δ) is of the proper level, the compare circuit 218 detects this and signals the flow processor accordingly. The next character of the control stream is then read out of the main memory 402 and stored in the *wr* register 212. Normally this next character in the control stream is a numerical character and designates the number of field marks (*fm*) past the detected level control character, a desired field of data is located in the master stream of data (Δ). For example, if the control stream contains the characters (*lc*) (1) (3) it means that the first level (*lc*) (1) in the master stream is to be located. After the first (*lc*) (1) is located three field marks (*fm*) are counted. Immediately following the third field mark is the designated field. To this end the field mark counter 222 counts the field mark characters stored in the *rr* register 216 from the master stream of data (Δ) after the desired level is found. When the count of the *fm* counter 222 is equal to the number contained in the *wr* register 212 the compare circuits 218 provides a signal causing an operator to be read from memory and to be stored into the OR register 214. The processor then performs the operation specified by the order stored in the OR register 214.

*Detailed description*

Before considering the details of circuits of the flow processor 200, consider some of the details of the master tape transport 110 and the new master tape transport 112, and associated control units.

The master tape transport 110 has a read head assembly 110*b*, well known in the computer art for reading information from the master tape 110*a*, character by character, and presenting the signals to the control unit 111. The control unit 111 is a conventional control unit commonly used in the computer art for controlling the tape transport 110, for shaping the signals read by the read head assembly 110*b* and applying the signals to an output circuit 111*b* a character at a time. For purposes of explanation, the characters read from the tape 110*a* have six bits.

The control unit 111 also has a strobe line 111*a* which is connected to the flow processor 200. The control unit 111 is operative for applying a strobe signal on the strobe line 111*a* in coincidence with the application of a character, read from tape 110*a*, to the output circuit 111*b*. In this manner the strobe line 111*a* signals the flow processor 200 when a character is being read from the tape 110*a* so that the character can be stored.

The new master tape transport 112 is also a conventional tape transport well known in the computer art and has a write head assembly 112*b* for writing signals on tape 112*a*, character by character. The control unit 113 is a conventional control unit for the tape transport 112 for controlling the operation of the master tape transport 112. The control unit 113 has an output line 113*a* at which a control signal is applied whenever the control unit 113 is about to cause a character of signals at the input circuit 113*b* to be written on the magnetic tape 112*a*. The control unit 113 is operative for writing six bit characters on the tape 112*a*, sequentially one right after another, so that there is a series of evenly spaced characters written on the tape 112*a*.

For purposes of illustration start switches 111*c* and 113*c* are provided for the control units 111 and 113 for initiating the operation of the corresponding control units. When the switches 111*c* and 113*c* are actuated they apply a control signal, from the output circuit of a source of potential represented by the symbol E, to the corresponding control units causing them to initiate the operation of the corresponding tape transport. Although manually operated switches are shown by way of illustration in FIGURE 1, the switches 111*c* and 113*c* in an actual data processing system may comprise gating circuits or relays which are automatically energized by the flow processor 200.

Figure 2:
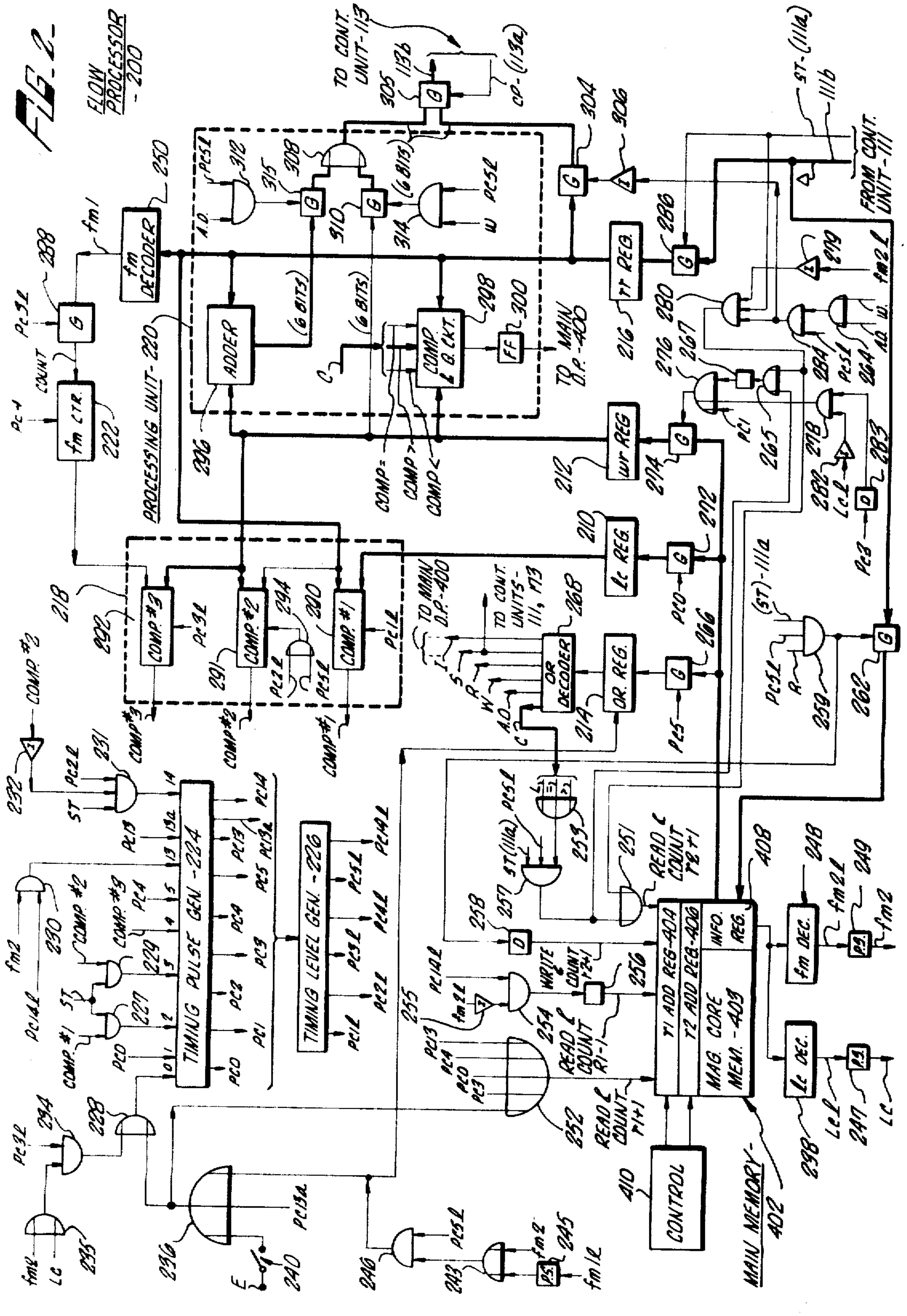
FIG. 2 is a detailed block diagram of the flow processor shown in FIG. 1 and embodying the present invention.

Consider the details of the flow processor 200 as shown in FIGURE 2. The flow processor 200 includes a timing pulse generator 224 and a timing level generator 226. The generators 224 and 226 generate the primary timing and sequencing control signals for the flow processor 200. The timing pulse generator 224 has nine states of operation and corresponding thereto nine output circuits referenced by the symbols PC0, PC1, PC2, PC3, PC4, PC5, PC13, PC13*a* and PC14. Corresponding to the nine output circuits are nine input circuits to the timing pulse generator 224. The timing pulse generator 224 is constructed in a well known manner in the computer art for generating a narrow output pulse on an output line which corresponds to an input circuit receiving a control signal. The output pulses are of approximately one-half microsecond duration.

The input circuits associated with the output circuits PC0, PC1, PC2, PC3, PC4, PC5, PC13, PC13*a* and PC14 are connected to the following circuits, respectively; an OR gate 228, output circuit C0, AND gate 227, AND gate 229, output circuit COMP #3 of the compare circuit 218, output circle PC4, AND gate 230, output circuit PC13 and AND gate 231.

The timing level generator 226 is connected to the output circuits PC0, PC1, PC2, PC3, PC4, PC5 and PC14 and corresponding to these circuits has output circuits PC1*l*, PC2*l*, PC3*l*, PC4*l*, PC5*l*, and PC14*l*. The timing level generator 226 is responsive to a signal at one of the output circuits PC1, PC2, PC3, PC4, PC5 and PC14 for forming a continuous output signal level, at the corresponding output circuit thereof until a new signal is applied at one of the other output circuits of the timing pulse generator 224. Thus, the timing pulse generator 224 forms output pulses, whereas, the timing level generator 226 forms level control signals.

The OR gate 228 has input circuits connected to an AND gate 234 and an OR gate 236. The AND gate 234 has its input circuits connected to the output circuit PC3*l* and a gate 235. The gate 235 has its inputs connected to an ouput circuit Lc of a pulse shaping circuit 247 and the *fm*2 output circuit of pulse shaping circuit 249. The OR gate 236 has input circuits connected to a start switch 240, the PC13*a* output circuit and AND gate 246. The OR gate 246 has input circuits connected to an OR gate 243 and the output circuit PC5*l*. The OR gate 243 has input circuits connected to the output circuit *fm*1 of an *fm* decoder 250 through a pulse forming circuit 245 and the output circuit *fm*2 of an *fm* decoder 245.

The AND gate 227 has input circuits connected to the output circuits COMP #1 of the compare circuit 218 and the ST(111*a*) output circuit of the control unit 111. The AND gate 229 has input circuits connected to the output circuits COMP #2 of the compare circuits 218 and to the output circuit ST(111*a*). The gate 230 has its input circuits connected to the output circuit *fm*2 of the *fm*2 decoder 248 and the output circuit PC14*l*. The gate 231 has input circuits connected to the output circuits ST(111*a*), an inverter circuit 232 and the output circuit PC2*l*. The inverter circuit 232 is a conventional signal inverter circuit operative for applying a control signal to the gate 231 in the absence of a control signal at the output circuit COMP #2.

Refer now to the main memory 402. For ease of explanation, the main memory 402 is shown in FIG. 2. However, as indicated in FIG. 1, the main memory 402 is actually a part of the main data processor 400 rather than the flow processor 200. The main memory 402 includes two address registers *r*1 and *r*2 and a magnetic core memory 403. Also included is an information register 408. The magnetic core memory 403 is a conventional magnetic core memory composed of magnetic cores having substantially rectangular hysteresis loops similar to the memory systems shown and described in chapter 7 of the book entitled "Digital Computer Fundamentals" by Thomas C. Bartee published by the McGraw-Hill Book Company, Inc. in 1960. The memory is arranged for reading and writing information a character at a time. A character is composed of six digital bits. The information register 408 is a buffer register and stores characters as they are transferred in and out of the magnetic core memory 403 in a conventional manner. The main memory 402 is adapted in a conventional manner so that whenever a character is read out of an address memory location and stored into the information register 408, the character is subsequently written back into the same memory location such that the information is not lost.

The *r*1 address register 404 and the *r*2 address address register 406 are both used for addressing the magnetic core memory 403, depending on control signals applied thereto as described in detail hereinbelow. However, it should be noted at this point that the address registers 404 and 406 are adapted for addressing one character of storage in the magnetic core memory 403 and include gating circuits which allow the address contained in the registers to be counted up or down in accordance with such control signals.

The *r*1 address register 404 is for addressing the control stream of information, whereas, the *r*2 address register 406 for addressing the information stream.

The main data processor 400 also includes control circuitry and registers designated generally as 410 which initially store addresses into the registers 404 and 406. The circuitry 410 is arranged in a well known manner in the computer art and the details thereof are not described as an understanding thereof is not important for a full understanding of the present invention.

An OR gate 252 is connected to the input of the main memory 402 and applies control pulses thereto. The OR gate 252 is associated with the *r*1 register 404 and each time the OR gate 252 applies a control pulse to the main memory 402 it causes the memory location specified by the address contained in the *r*1 address register 404 to be addressed and the character thereof to be read out and stored in the information register 408. Subsequently, after the character is read out of the magnetic core memory 403, the pulse formed by the gate 252 also causes timing circuitry (not shown) in the main memory 402 to count the address contained in the *r*1 address register 404 up one address. The gate 252 has input circuits connected to the OR gate 236 and to the output circuits PC3, PC0, PC4 and PC13.

The main memory 402 also has an input circuit connected to the output circuit of a pulse generator 256. The pulse generator 256 has its input circuit connected to an AND gate 254. The AND gate 254 has its input circuits connected to a signal inverter circuit 255 and the PC14 output circuit. The signal inverter circuit 255 has its input circuit connected to the output circuit *fm*2*l*. The pulse generator 256 is a conventional pulse generator operative for applying pulses to the magnetic core memory 403 in response to a control signal applied thereto by the gate 254. The pulse generator 256 repeats the output pulse every 15 microseconds in response to a continuous control signal by the gate 254. The pulse generator 256 is also associated with the *r*1 register 404 and each pulse formed by the pulse generator 256 causes the control circuitry (not shown) in the memory 402 to read out the content of the memory location specified by the address in the *r*1 address register 404 and after the character has been read out causes the address contained in the register 404 to be counted down one address.

A delay circuit 258 is connected to the main memory 402. The delay circuit 258 has an input circuit connected to the output circuit of an AND gate 259. The delay circuit 258 is a conventional time delay circuit for applying a delayed control signal to the magnetic core memory 403 in response to an input pulse. The delay circuit 256 is associated with the *r*2 register 406 and first causes the main memory 402 to write a character into the storage location specified by the address in the *r*2 address register 406 and subsequently causes the content of the *r*2 address register 406 to be counted up one address.

The gate 259 applies a control signal, both to the delay circuit 258 and to a gating circuit 262, whenever signals are to be written into the magnetic core memory 402 from the master tape 111*a*. To this end, the AND gate 259 causes the gate 262 to store a character at the input circuit 111*b* into the information register 408 and subsequently the delayed pulse from the delay circuit 258 causes the character stored in the information register 408 to be written into the memory location of the magnetic core memory 403 specified by the *r*2 address register 406. The time delay between the formation of a pulse by the gate 259 and the formation of a pulse by the delay circuit 258 is sufficient to allow a character to be stored into the information register 408 by the gate 262 before the memory 402 stored the content of the information register 408.

A gate 251 is associated with the *r*2 address register 406. The OR gate 251 has input circuits connected to gates 257 and 280. Gate 257 has input circuits connected to the output circuits ST (111*a*) and PC5*l*, and an OR gate 253. The OR gate 253 has input circuits connected to the compare (C) output circuits of the OR decoder 268.

Whenever the gate 251 forms a control signal it causes the content of the memory location specified by the *r*2 address register 406 to be read out and subsequently causes the address stored in the *r*2 address register to be counted up one address.

Whenever a control signal is formed at the PC5 output circuit an order character is to be stored in the OR register 214 from the information register 408. The control signal at the PC5 output circuit causes a gate 266 to store the order stored in the information register 408 into the OR register 214.

The OR register 214 has an OR decoder 268 connected thereto. The OR decoder 268 is a conventional decoding circuit which has six output circuits at which unique control signals are applied corresponding to the type of order stored in the OR register 214. For purposes of explanation, it is assumed that the flow processor 200 has six different types of orders. These orders are as follows: a compare order (C), (there are actually three compare orders explained in detail hereinafter), an arithmetic order (A.O.), a write order (W) a read order (R), a stop order (S) and an interrupt order (I). The stop and interrupt orders cause actions to be taken by the main data processor 400.

The OR register 214, the *lc* register 210 and the *wr* register 212 are conventional flip-flop registers for storing a character of digital signals.

The OR register 214 has gating circuits (not shown) for resetting the flip-flops thereof to zero in response to a control signal from an AND gate 246.

A gate 272 is provided for storing characters into the *lc* register 210 from the information register 408. The gate 272 is a conventional gating circuit which stores a level control character into the *lc* register 210 in response to a control signal at the PC0 output circuit of the timing pulse generator 224.

A gate 274 is provided for storing information stream characters and numerical characters identifying field mark characters into the *wr* register 212. The gate 274 is a conventional gating circuit which stores a character into the *wr* register 212 in response to a control signal at the output circuit of an OR gate 276.

The OR gate 276 has input circuits connected to the output circuit PC1, gate 278 and a delay circuit 267. The gate 278 has input circuits connected to a signal inverter circuit 282 and a delay circuit 283. The signal inverter circuit 282 is connected to the output circuit Lc1 of the 1*c* decoder 238. The delay circuit 283 is connected to the PC3 output circuit. The delay circuit 267 is connected to OR gate 265 which has input circuits connected to the gate 280 and to the gate 257.

The pulse at PC3 causes the gate 252 to initiate a read operation in the memory 402 and cause a numerical character identifying a field mark character (*fm*) to be read out of the control stream in memory. The gates 278 and 276 cause the numerical character to be stored into the *wr* register 212 by the gate 274. However, since the numerical character is not stored in the information register 408 until after the pulse at PC3, the pulse at PC3 must be delayed before being used to strobe the character into the *wr* register 212. To this end the delay circuit 283 is adjusted to provide the proper delay.

The AND gate 280 has its input circuits connected to an AND gate 284, and an inverter circuit 279 and the output circuit ST (111*a*). The AND gate 284 has its input circuits connected to the output circuit PC5 and an OR gate 264. The OR gate 264 has its input circuits connected to the A.O. and W output circuits of the order decoder 268. The inverter 279 has its input circuit connected to the output circuit *fm*2*l*.

A gate 286 is provided for storing data into the *rr* register 216 from the master stream of data (Δ) flowing from the master tape transport 110. The gate 286 is a conventional gating circuit well known in the computer art for storing signals into the *rr* register 216, character by character, in response to control signals at the output circuit ST (111*a*).

The output circuit of the *rr* register 216 is connected to the input circuit of the *fm* decoder 250. The *fm* decoder 250 is a conventional decoding circuit which senses the presence of a field mark character in the *rr* register 216 and applied a control signal at the output circuit *fm*1 in response thereto.

A gate 288 is connected getween the *fm* decoder 250 and the count input circuit of the *fm* counter 222. The gate 288 is a conventional gating circuit which applies the control signal formed at the output circuit *fm*1 to the count input circuit of the *fm* counter 22 in response to a control signal at the PC3*l* output. The *fm* counter 222 is a ring-type counting circuit arranged in a well known manner in the computer art for counting the state thereof up one in response to the application of each new control signal by the gate 288.

The compare circuits 218 include three separate compare circuits. These compare circuits are referred to as compare #1 circuit 290, compare #2 circuit 291 and the compare #3 circuit 292. The compare #1 circuit 290 has input circuits connected to the *rr* register 216 and the *lc* register 210. The compare #1 circuit 290 also has an input circuit connected to the PC1*l* output circuit and its output circuit is the one referenced by the symbol COMP. #1. The compare #1 circuit 290 is operative for applying a control signal at the COMP. #1 output circuit in response to a control signal at the PC1*l* output circuit whenever a level control character is stored in the *rr* register 216 identical to the level control character stored in the level control register 210.

The compare #2 register 291 has input circuits connected to the *wr* register 212 and the *rr* register 216. The compare #2 circuit 291 also has a control circuit connected to an OR gate 294. The OR gate 294 has input circuits connected to the output circuits PC2*l* and PC5*l*. The compare #2 circuit 291 is operative for applying a control signal at the COMP. #2 output circuit thereof whenever a control signal is applied at either of the output circuits PC2*l* or PC5*l*, provided the characters stored in the *rr* register 216 and the *wr* register 212 are equal.

The compare #3 circuit 202 is connected to the output circuit COMP. #3 and has a control circuit connected to the PC3*l* output circuit. The compare #3 circuit 292 is operative for applying a control signal at the PC3*l* output circuit, provided the character stored in the *wr* register 212 is equal to the count of the *fm* counter 222.

Refer now to the processing unit 220. The processing unit 220 includes an adder circuit 296 which is a conventional series-parallel adder circuit for adding together two characters stored in the *wr* register 212 and the *rr* register 216 and for providing an output consisting of a character corresponding to the sum. The adder circuit 296 is of a type similar to that described in the above-referenced book entitled "Digital Computer Fundamentals" by Thomas C. Bartee at pages 180 through 184.

The processing unit 220 also includes a compare and gating circuit 298. The order decoder 268 has three output circuits designated compare for equal (=), compare for greater than (>) and compare for less than (<). The compare and gating circuit 298 has control circuits connected to these output circuits of the order decoder 268. The compare and gating circuit 298 is operative for setting the flip-flop 300 into either a true or false state depending on the outcome of a comparison. If the specified comparison is successfully made, the final state of the flip-flop 300 will be false. However, if the desired comparison is not successfully made, the final state of the flip-flop 300 will be true. Actually the compare and gating circuit 298 compares a series of different characters sequentially as described hereinbelow.

FIG. 3 is a logical table illustrating the operation of the compare and gating circuit 298. The detailed circuits of the compare and gating circuit 298 are not described herein but, as appreciated by those skilled in the art, the compare and gating circuit 298 is implemented using conventional diode gating circuits in a manner well known in the computer art according to the logical operation illustrated in the table of FIG. 3. Referring to FIG. 3, it will be noted that the table is divided up into rows and columns. The left-hand column illustrates the three different types of compare orders. For example, compare order (1)*wr*>*rr*, specifies that the compare and gating circuit 298 is to determine if the series of characters of the information stream sequentially stored in the *wr* register 212 is larger than the series of characters of the master stream of data (Δ) stored in the *rr* register 216. The compare order (2)*wr*<*rr* specifies that the compare and gating circuit 298 is to determine if the series of characters in the information stream sequentially stored in the *wr* register 212 is smaller than the series of characters in the master stream of data (Δ) sequentially stored in the *rr* register 216; the compare order (3)*wr*=*rr* specifies that the compare and gating circuit 298 is to determine if the series of characters of the information stream stored in the *wr* register 212 is equal to the series of characters in the master stream of data (Δ) stored in the *rr* register 216. If the desired comparison is not made the flip-flop 300 is finally set into a true state. If the desired comparison is made then the final state of the flip-flop 300 will be false.

The output circuit of the *rr* register 216 is coupled through gates 304 and 305 to the circuit 113*b* which is connected to the new master tape control unit 113. The gate 304 is operative for applying the character stored in the *rr* register 216 to the gate 305 in response to a control signal from a signal inverter circuit 306. The signal inverter 306 is a conventional signal inverter circuit similar to 232 having an input circuit connected to the gate 284. The gate 305 has a control circuit connected to the output circuit CP (113*a*) from the control unit 113. The gate 305 is operative for inserting a character of signals applied to the input circuit thereof into the master stream of data (Δ) in response to a control signal at the output circuit CP (113*a*) from the control unit 113. The gate 305 also has an input circuit connected to an OR gate 308. The OR gate 308 has input circuit connected to an adder 296 and the *wr* register 212 by means of gates 310 and 315. The gates 315 and 310 have control circuits connected to the output circuits of gating circuits 312 and 314. The gates 315, 310 and 308 are conventional gating circuits operative for coupling the six bit output signals from either the adder circuit 296 or the *wr* register 212 to the gate 305 depending on whether gate 312 or 314 applies a control signal to the gates 315 and 310. The gate 308 actually comprises a plurality of OR type gating circuits and has two six bit input signals from the gates 304 and 310 but provides a six bit output signal to the gate 305 corresponding to the signals applied thereto by either the gate 304 or the gate 310.

The gate 312 has input circuits connected to the output circuit A.O. of the OR decoder 268 and the PC5*l* output circuit of the timing level generator 226. The gate 314 has input circuits connected to the W output circuit of the OR decoder 268 and the PC5*l* output circuit.

*Operation*

Consider now the operation of the flow processor 200 as it executes the control stream of information shown in FIG. 5 using the information stream shown in FIG. 6 and the master stream of data (Δ) shown in FIG. 4.

As a preliminary step, an operator inserts the level control characters (*lc*) and associated numerical characters, as well as field mark characters (*fm*) in the characters of data in the master stream of data (Δ), shown in FIG. 4. The operator then prepares the control stream of information shown in FIG. 5 and the information stream shown in FIG. 6. As pointed out hereinabove, the master tape stream of data (Δ) shown in FIG. 4 is actually recorded on tape, serial by character, parallel by bit. The master tape transport 110 reads the characters of data from the master tape 110*a*, character by character, sending the characters through the *rr* register 216 to the new master tape transport 112. Thus, referring to FIG. 4, a level control character, a character 1, an account number, a field mark, etc. flow through the *rr* register 216 sequentially character by character in this order.

Considering a simplified description of the operation of the flow processor under control of the control stream of information shown in FIG. 5 and the information stream of information shown in FIG. 6:

*First*.—The control stream has two level control characters, one after the other, each followed by the same numeral, a numeral 1, [i.e. (*lc*) (1) (*fm*) (*lc*) (1)]. These are characters ①, ②, ③, ④, and ⑤. This means that the first record of the master stream of data (Δ), shown in FIG. 4, is to be skipped and the flow processor is to go to the second record delimited by the second (*lc*) (1). The field mark (*fm*) at ③ is placed in the control stream for control purposes as explained hereinafter.

*Second*.—Characters ⑥, ⑦ ⑧ and ⑨ in the control stream specify that two level control characters of the second level [i.e. (*lc*) (2)] in the master stream of data (Δ), shown in FIG. 4, are to be searched for. The second one of the two level control characters of the second level is shown at line 7 of the second record.

*Third*.—Character ⑩ of the control stream specifies that after the two control characters of the second level one field mark character (*fm*) is to be counted and the field immediately following is to be operated on. The one field mark character is shown at line 7 and the field to be operated on is shown at line 8 in the second record of FIG. 4.

*Fourth*.—Character ⑪ of the control stream specifies that the characters shown at line 7 in the field are to be added with the characters ① and ② in the information stream (see FIG. 6).

*Fifth*.—Characters ⑬ and ⑭, which are the level control characters (*lc*) (1), specify that the third record is to be searched for. The third record is to be looked for as these level controls of the first level [i.e. (*lc*) (1)] have been encountered in the control stream to this point.

*Sixth*—Characters ⑮, ⑯, ⑰, ⑱, ⑲, ⑳, ㉑ and ㉒ of the control stream designate that four level control characters of the second level [i.e. (*lc*) (2)] in the master stream of data (Δ) are to be looked for. The last of the four level control characters of the second level is shown at line 12 of the third record of FIG. 4.

*Seventh*.—Characters ㉓ and ㉔ in the control stream designate that a level control of the third level [(*lc*) (3)] is to be searched for. This is found at line 13 of the third record.

*Eighth*.—Character ㉕ of the control stream designates that two field marks (*fm*) are to be counted following the level control of the third level and the field immediately following the second field mark is the one to be operated on. This last one of the two field marks is shown at line 14 of the third record. Thus, the field at line 15 of FIG. 4 is the one to be operated on.

*Ninth*.—Character ㉖ of the control stream, a write character, designates that the character ④ in the information stream, a character "E" is to be written at line 15 of the master stream of data (Δ) shown in FIG. 4.

*Tenth*.—Characters ㉗, ㉘, ㉙, ㉚, and ㉛ of the control stream specify that the field shown at line 18 of the third record is to be searched for.

*Eleventh*.—Character ㉜ of the control stream designates that characters ⑥, ⑦, ⑧ and ⑨ of the information stream are to be compared with the year of automobile shown at line 18 of the third record of FIG. 4. The *fm* character in the information stream causes the comparison to be terminated.

Consider the operation of the flow processor in detail. The programmer arranges the control stream of data (see FIG. 5) and stores it in sequentially addressable memory locations such that the *r*1 addresses register 404 will address the characters thereof in sequence. The programmer arranges the information stream (see FIG. 6) and stores the characters thereof in sequentially addressable memory locations such that the *r*2 address register 406 will address the characters thereof in sequence.

Initially the *r*1 and *r*2 address register 404 and 406 are set so that they point at the characters ① of the control stream of information (shown in FIG. 5) and the information stream of data (shown in FIG. 6) respectively. The *r*1 and *r*2 registers are set and the registers 214, 210, 212 and 216 as well as the flip-flop 300 are set to zero by computer control 410 in a well known manner.

The operation of the flow processing system is initially started by simultaneously actuating the switches 111*c*, 113 and 240. Actuation of the switches causes the tape control units 111 and 113 to start the operation of the master tapes 110 and 112 and causes the OR gate 236 to apply a control signal through the OR gates 228 and 252 to the main memory 402 and to the timing pulse generator 224. The pulse to the main memory 402 causes the control stream character ① designated by the address in the *r*1 register 404 to be read out, stored in the information register 408 and subsequently causes the address in the *r*1 register 404 to be counted up one address. At this point character ① of the control stream, shown in FIG. 5, which is a level control character (*lc*), is stored in the information register 408.

The operation of the memory 402 is much faster than the generator 224 such that subsequently the timing pulse generator 224 forms a control pulse at the PC0 output circuit causing the gate 272 to store the level control character (*lc*) (which is stored in the information register 408) into the *lc* register 210 and also causes the main memory 402 to read out character ② of the control stream which is a character 1. Also the content of the *r*1 register 404 is counted up one address ready for the next memory cycle.

The above-noted control pulse at the PC0 output circuit also causes the timing pulse generator 224 to form a control pulse at the PC1 output circuit after the character 1 is read out of memory and stored in the information register 408. The control pulse at the PC1 output circuit causes the OR gate 276 to activate the gate 274, causing it to store the character 1 (which is stored in the information register 408) into the *wr* register 212.

Tape units 110 and 112 are still reading and writing respectively. The control signal at the PC1 output circuit also causes the timing level generator 226 to start forming a continuous level control signal at the PC1 output circuit. This causes the compare #1 circuit 290 to start comparing the level control character stored in the *lc* register 210 with the characters of the master stream of data (Δ) sequentially stored in the *rr* register 216.

The operation of the flow processor is very much faster than the tape units and the signal is formed at the PC1*l* before the first character on tape 110*a* has been read. Subsequently, the first character of the master stream of data (Δ) is read from tape 110*a* and applied to the circuit 111*b* and to the gate 286. Subsequently, the control unit 111 forms a strobe pulse at the line ST (111*a*) causing the master stream character to be stored into the *rr* register 216. As indicated in FIG. 4, the first character in the master stream of data (Δ) is a level control character (*lc*), therefore, the compare #1 circuit 290 detects equality and applies a control signal at the COMP. #1 output circuit indicating that a level control character has been detected.

When the next (second) character of the control stream is read, the control unit 111 applies another control signal to the line ST (111*a*) causing the next character, a character 1, to be stored in the *rr* register 216. The signal at COMP #1, in coincidence with the signal at ST (111*a*), causes the gate 227 to apply a pulse to the generator 224. The timing pulse generator 224 then forms a control pulse at the PC2 output circuit which, in turn, causes a continuous control signal at the PC2*l* output circuit.

The control signal at the PC2*l* output circuit causes the gate 294 to apply a control signal to the compare #2 circuit 291 and causing it to compare the content of the *wr* register 212 with the content of the *rr* register 216. The second character of the master stream of data (Δ), which is stored in the *rr* register 216, is a numerical character 1 and the character previously stored in the *wr* register 212 from the control stream is also a character 1 (i.e. character ②). Therefore, the compare #2 circuit 291 applies a control signal at the COMP #2 output circuit.

When the third character of the master stream of data (Δ) is read from the tape 110*a* and the next pulse is formed at 111*a* (ST), the coincidence of signals at 111*a* (ST) and COMP #2 causes the gate 229 to apply a control pulse to the timing pulse generator 224 causing a control pulse to be formed at the PC3 and PC3*l* output circuit.

The third character of the master stream of data (Δ) is stored in the *rr* register 216 and is the first character of the account number of the first record (see FIG. 4). The control signal at the PC3 output circuit causes the gate 252 to apply a control signal to the memory 402 causing character ③ of the control stream to be read out of the memory 402 and causing the address in the *r*1 register 404 to be counted up one more address.

The character ③ of the control stream is a field mark character (*fm*) (see FIG. 5). Therefore, the *fm* decoder 248 causes the pulse shaping circuit 249 to apply a pulse signal at *fm*2. The pulse *fm*2 causes the gates 235, 234 and 228 to apply a pulse to the generator 224 causing another signal to be applied to gate 252 via the PC0 output circuit. As before, this causes the memory to be addressed, using the *r*1 register 404 causing the character ④ of the control stream to be read out and stored in the information register 408 and causing the address in the *r*1 register 404 to be counted up by one more address.

It should be noted at this point that preceding PC0 level control character *lc* is read and at PC0 the level control character number is read. During PC1 the level control character in the *lc* register 210 is compared against the character in the master stream of data stored in the *rr* register 216 and during PC2 the level control character number in the *wr* register 212 is compared against a character in the master stream of data stored in the *rr* register 216. During PC3 a number character is found in the control stream of data following the level control character number if the correct level has been located. However, in this case record 2 is desired not record 1 and the *fm* character is placed in the control stream of data following the level control character number to indicate that another record is to be searched for.

The character ④ in the control stream is another level control character (*lc*). Since a level control character is read out of the core memory 403 through the information register 408, the *lc* decoder 238 causes the pulse shaper 247 to apply a pulse signal at the L*c* output circuit. This signal, along with the control signal at the PC3*l* output circuit, causes the gates 235, 234 and 228 to again reset the timing pulse generator 224 into state zero. The signal formed by gate 228 causes the level control character (*lc*) to be read out through the information register 408 and the signal at PC0 causes the level control character *lc* to be stored in the register 210 as before.

From the foregoing discussion it will be recognized that the timing pulse generator 224 subsequently forms a control pulse at the PC1 output circuit. The above-mentioned control pulse at the PC0 output circuit and the pulse at PC1 cause the character ⑤ of the control stream, which character is a character 1, to be read out of the memory 402 and stored into the *wr* register 212 as described hereinabove.

Tape 110*a* is still being read and at this point the pulse generator 224 remains in state one and the compare #1 circuit 290 starts comparing the level control character (*lc*) stored in the *wr* register 210 with the characters of the master stream of data (Δ) as they are serially stored in the *rr* register 216. Subsequently, the level control character (*lc*), shown at line 2, the first record (FIG. 4) is stored in the *rr* register 216 causing the compare #1 circuit 290 to apply a control signal at the COMP #1 output circuit. The following strobe signal at ST (111*a*) causes the timing pulse generator 224 to form a control pulse at the PC2 output circuit causing a control signal at the PC2 output circuit. Subsequently, the compare #2 circuit 291 again compares the level character stored in the *wr* register 212 (a character 1) with the level character stored in the *rr* register 216 from the master stream of data (Δ). With reference to line 2, of the first record (FIG. 4), it will be seen that the level character following the level control character (*lc*) is the character 2. Therefore, the level character in the *rr* register 216 is not equal to te level character in the *wr* register 212 and, hence, the compare #2 circuit 291 does not form a control signal at its output circuit. This indicates that this is not the desired level in the master stream of data (Δ). The foregoing searching operation must be repeated and since the *r*1 register 414 now contains the address of the character ⑥ in the control stream, the flow processor must back up in the control stream and again bring out the level control character and associated number, which are characters ④ and ⑤ in FIG. 5. This is accomplished by counting the *r*1 register 414 down until the field mark character (*fm*) (character ③) is read.

To this end, the control signal at COMP #2 during the control level at PC2*l* causes the inverter circuit 232 and the gate 231 to apply a control signal to the timing pulse generator 224 during the next strobe pulse at the ST (111*a*) output circuit thereby causing the timing pulse generator 224 to form a control pulse at the PC14 output circuit which causes a control pulse at the PC14 output circuit.

The lack of a signal at *fm*2*l* and the presence of a signal at PC14*l* then causes the inverter circuit 255 and the gate 254 to apply a control signal to the pulse generator 256 causing the *r*1 register 404 to count the address therein down by one and, subsequently, the content of the newly addressed memory location is read out. The *r*1 register 404 is initially pointing at the character ⑥, therefore, the address is counted down to character ⑤. Therefore, the character ⑤ is read out. This is a numerical character 1. Since the character is not a field mark character (*fm*), the *fm* decoder 248 still does not apply a control signal at the *fm*2*l* output circuit and the gate 254 continues applying a control signal to the pulse generator 256. Thus, the pulse generator 256 applies another pulse at the PC14 output to the main memory 402 causing the address contained in the *r*1 register 404 to be counted down another address and causing the new address specified by the *r*1 register 404 to be read out and stored in the information register 408. This time the character ④ in the control stream, which is the level control character (*lc*), is read out and stored in the information register 408. Subsequently, another pulse is applied at the PC14 output to the main memory 402 by the pulse generator 256 causing the content of the character ③ in the control stream, which is a field mark character (*fm*), to be read out and stored in the information register 408. The *fm* decoder 248 detects the presence of the field mark character (*fm*) causing a control signal to be applied at the *fm*2*l* output circuit causing the pulse shaping circuit 249 to apply a pulse at the *fm*2 output circuit and causing the generator 256 to stop forming pulses.

The control signal at the *fm*2 output circuit, in coincidence with the control signal at the PC14*l* output circuit, causes the gate 230 to apply a control signal to the timing pulse generator 224, causing it to form a control pulse at the PC13 output circuit. The control pulse at the PC13 output circuit causes the gate 252 to again apply a control pulse to the main memory 402 causing the field mark character (*fm*) to again be read out using the same address in the *r*1 register 404 and subsequently the address contained in the *r*1 register 404 is counted up by one address. At this point the *r*1 register 404 contains the address of the character ④ in the operator stream, which is the level control character (*lc*).

The control pulse at the PC13 output circuit also causes the timing pulse generator 224 to form a control pulse at the PC13*a* output circuit. The control pulse at the PC13*a* output circuit causes the gates 236 and 228 to apply a control pulse to the timing pulse generator 224 and to the gate 252 causing the generator 224 to form another pulse at the PC0 output and causing the fourth character of the control stream, which is the level control character (*lc*), to be read out again (as described hereinabove) and stored in the register 210. Subsequently, the numerical character 1 (character ⑤) following the level control character (*lc*) is read out of the magnetic core memory 403 and stored in the *wr* register 212.

The operation of the generators 224 and 225 and the memory 402 is very rapid and much faster than information being read from tape. Therefore, the characters ④ and ⑤ from the control stream are relocated before any more level control characters have had a chance to be read from the master stream of data (Δ) on tape 110*a*.

Again the compare #1 and compare #2 circuit 290 and 291 look for a level control character followed by a level character 1 in the master stream of data (Δ). However, the proper level is not found in the rest of the first record. The proper level is only found at the beginning of the second record. Thus, each time a level control character (*lc*) and its associated level character is detected in the first record of the master stream of data (Δ), the *r*1 register 404 is backed up again and the above operation is repeated.

It should now be recognized that by putting two of the same level control characters, side by side, as at ①, ② and ④, ⑤ of FIG. 5, the corresponding level in the control stream is skipped once for each time the combination is repeated.

Finally, assume that the second record in the master stream of data (Δ) arrives at the read head, 110*b* of 110 and the characters *lc* and 1 of line 1 in the second record are serially read out and stored in the *rr* register 216. When the level character 1 is stored in the *rr* register 216, the compare #2 circuit 291 detects the presence of the correct level and applies a control signal at the COMP. #2 output circuit. The pulse generator 224 is then set so that a signal is formed at PC3.

Referring to FIG. 5, it will be noted that the control stream characters ⑥ through ⑨ are two successive control characters of the same level [i.e. (*lc*) (2) (*lc*) (2)]. This means that one level control character, of the second level, [i.e. (*lc*) (2)] and its associated field are to be skipped in the master stream of data (Δ). Thus the second level control character (*lc*) (2) shown at line 7 of the second record (FIG. 4) is searched for.

Continuing with the description of operation, the control pulse at the PC3 output circuit causes the gate 252 to apply another control pulse to the main memory 402 causing the character ⑥ of the control stream to be read out and stored in the information register 404. The *r*1 address register 404 is counted up by one address so that the character ⑦ in the control stream is now being pointed at. The level control character (*lc*) stored in the information register 408 causes the *lc* decoder 238 to apply a control signal to the pulse shaping circuit 247 causing a control pulse to be applied at the Lc output circuit. The control pulse at the Lc output circuit, in coincidence with the control level signal at the PC3*l* output circuit, causes the gates 235, 234 and 228 to reset the timing pulse generator 224 so that a control pulse is again applied at the PC0 output circuit. The control pulse at the PC0 ouput causes the character ⑦ of the operator stream (addressed by the *r*1 register 404) to be read out and the following control pulse at the PC1 output circuit causes the gates 276 and 274 to store the character ⑦ (a character 2) into the *wr* register 212.

At this point characters ⑥ and ⑦ of the control stream (Δ), which are a level control character (*lc*) and a level character 2, are stored in the *lc* register 210 and the *wr* register 212. Subsequently, the level control character *lc* and associated numerical character 2 in the master stream of data (Δ), shown at line 2, of record 2, are read out and stored character by character, in the *rr* register 216. The level control character (*lc*) is detected by the compare #1 circuit 290 and subsequently the compare #2 circuit 291 detects the numerical character 2. The pulse at the PC3 output circuit of the timing pulse generator 224 causes the level control character (*lc*) to be read from memory which indicates that the desired field in the second record has not as yet been located. Therefore, the timing pulse generator 224 is again reset by gates 235, 234 and 228 so that a pulse is again formed at PC0 causing the character ⑧ of the operator stream, which character is a level character 2, to be read out and stored in the *wr* register 212. The master stream of data (Δ) continues flowing through the *rr* register 216 until the level control character (*lc*) and numerical character (2) shown at line 7 of the second record are sequentially read out and stored in the *rr* register 216. As this occurs the compare #1 and compare #2 circuits 290 and 291 detect the presence of the correct control level causing the gates 227 and 229 to apply another control pulse at the PC3 output circuit and another control level at the PC3*l* output circuit.

The control pulse at the PC3 output circuit causes the gate 252 to apply another control signal to the main memory 402 causing the character ⑩, a numerical character 1, in the operator stream to be read out and stored in the information register 408. It also causes the *r*1 register 408 to count up the address contained therein by one address so that it points at character ⑪ in the control stream. The L*c* decoder 238 detects that this is not a level control character and does not apply a control signal at the L*cl* output circuit. Therefore, the inverter circuit 282 applies a control signal to the gate 278. The pulse at PC3 causes the delay circuit 283 to start a delay cycle and after a delay long enough for a character to be read out of the magnetic core memory 403, the delay circuit 283 applies a delay control pulse to the gate 274 through the gates 278 and 276 causing it to store character ⑩, a numerical character 1, of the control stream into the *wr* register 212.

A numerical character following another numerical character is always for purposes of identifying the desired field mark (*fm*) in the master stream of data (Δ). The numerical character 1, from ⑩ in the control stream, indicates that the field immediately following the first field mark in the master stream of data (Δ) is the field in the master stream of data which is to be up-dated. To locate the proper field, the field marks in the control stream are counted.

To this end, the field mark counter 222 starts counting the field marks (*fm*) as they are stored in the *rr* register 216 and the *fm* decoder 250 detects the field marks. The first field mark character (*fm*) indicated at line 7, of the second record, in the master stream of data (Δ), causes the *fm* counter 222 to count from state zero to state one. The compare #3 circuit 292 detects that the *fm* counter 222 is in a state equal to the numerical character 1 stored in the *wr* register 212 and applies a control signal at the COMP. #3 output circuit. The control signal at the COMP. #3 output circuit causes a control pulse at the PC4 output circuit.

Now the proper field has been located, namely, the one at line 8 of the second record in the master stream. At this point the following are to be accomplished. First, the *fm* counter 222 is to be reset to a zero state ready to count more field mark characters and the ADD operator, which is character ⑪ of the control stream, is to be read out and stored in the OR register 214.

To this end, the control pulse at the PC4 output circuit resets the *fm* counter 222 to state zero and causes the gate 252 to apply a control pulse to the main memory 402 causing the ADD operator (character ⑪ of the control stream) to be read out and stored in the information register 408. Also the *r*1 register 414 counts the address therein up by one so that it points at the character ⑫ in the control stream.

The control pulse at the PC4 output circuit also causes the timing pulse generator 224 to be set into state five and form a control pulse at the PC5 output circuit causing a control signal level at the PC5*l* output circuit. The control pulse at the PC5 output circuit causes the ADD operator contained in the register 408 to be stored into the operator register 214. Since the operator is an ADD operator it causes a control signal at the A.O. output circuit of the operator decoder 268.

With the operator contained in the operator register 214, the flow processor 200 now performs the specified arithmetic operation. Since it is an ADD operator, a character in the information stream is to be added or combined with a character of the master stream of data (Δ) and the appropriate signal is formed at A.O.

To this end, the gates 264 and 284 apply a control signal to the gate 280 and to the inverter circuit 306 in response to the signals at PC5*l* and A.O. The gate 280 in turn applies a control signal to the gate 265. When the first character of the age of the dependent indicated at line 8 of the second record, of the master stream of data (Δ) is read from the magnetic tape 110*a*, the control signal at the ST (111*a*) output circuit not only causes the gate 286 to store the character into the *rr* register 216, but causes the gates 280 and 265 to apply a control pulse to the delay circuit 267 and to the gate 251. The signal to gate 251 causes the memory 402 to be addressed using the *r*2 address register and read out character ⓪ of the information stream. As indicated in FIG. 6 the first character is a numerical character 1. This character is stored in the information register 408. Also the address in 2 is counted up so that it points at the character ② in the information stream. Subsequently, the delay circuit 267 times out and applies a delayed pulse to gate 276 causing the gate 274 to store the character ① of the information stream from the information register 408 into the *wr* register 212.

The adder circuit 296 then combines the characters stored in the *wr* register 212 and the *rr* register 216. Therefore a digit 1 is added to the age character stored in the *rr* register 216 from the master stream of data (Δ) and signals corresponding to the sum thereof are applied to the gate 315. The gate 312 causes the gate 315 to couple the sum character from the adder 296 to the gate 308 which, in turn, applies the signals to the gate 305. When the new master tape transport 112 is ready to write the new age character, a control pulse is applied at the line CP (113*a*) causing the gate 305 to gate out the new age character to the control unit 113 for storage on the new master tape 112*a*.

The adder circuit 296 has a built-in delay circuit (not shown) as described in the above-referenced book entitled "Digital Computer Fundamentals" by Thomas C. Bartee published by the McGraw-Hill Book Company, Inc. in 1960 for storing any carry signals. Therefore, if there is a carry generated by the sum of the two characters the carry is held in the delay circuit of the adder circuit 296 until the next character is read out of the master tape 110*a* and stored in the *rr* register 216.

As the second character of the person's age is read by the magnetic tape transport 110, another strobe pulse is formed at ST (111*a*). This strobe pulse in combination with the PC5*l* signal and the A.O. signal causes the gates 253, 257 and 251 to initiate a new memory cycle, using the *r*2 address register 406. The *r*2 address register 406 addresses the character ② of the information stream. This character, a character "0," is read out and stored into the *wr* register 212 under control of gates 264, 284, 280, 265 and 276 and the delay circuit 267. Also the *r*2 register 406 is counted up by one address, as described hereinabove, so that it points at the third character in the information stream. The adder circuit 296 again adds the content of the *wr* register 212 to the content of the *rr* register 216 which now contains the second character of the age of the dependant shown at line 8 of the second record (see FIG. 4). Since the *wr* register 212 now stores a 0 character, the adder 296 only adds any carry resulting from the previous addition and at the following control signal at ST (113*a*) the sum is applied as a character through the gate 305 back to the control unit 113 for storage into the new master tape transport 112.

It will now be evident that the two newly computed characters (representative of the age of the dependant) are written right back into the master control stream of data (Δ) in the very same positions as the age characters (shown at line 9 of the second record) read from the master tape 110*a*. In this manner, the master stream of data (Δ) is up-dated right at the same time the information flows from one tape transport to the other and does so without stopping either tape transport.

Consider how the ADD operation is terminated. A field mark character (*fm*) follows the age characters in the master stream of data (Δ) as shown at line 8 of FIG. 4. When this character is read, a signal is formed at ST (111*a*) causing the gates 264, 284, 280 and 251 to apply a control signal to the memory 402, and to the delay circuit 267. This causes the character ③ of the information stream to be addressed, using the *r*2 register 406, and to be read out through the information register 408 and stored into the *wr* register 212 as described hereinabove. The character ③ is a field mark character, therefore, the pulse shaping circuit 249 applies a control pulse at *fm*2 to the gate 243. Also field mark character (*fm*), in the master stream of data (Δ) (shown at line 8), is stored in the *rr* register 216 and the *fm* decoder 250 forms a control signal at the *fm*1 output circuit causing the pulse shaping circuit 245 to apply a control pulse to the gate 243. Either the pulse at *fm*2 or the pulse from the pulse shaping circuit 245 causes the gates 243, 246, 242, 236 and 228 to reset the timing pulse generator 224 so that a pulse is formed at PC0 and causes the gate 252 to initiate a new memory cycle using the *r*1 register 404.

In this manner, another character of the control stream, namely the character ⑬, is read out as described hereinabove.

Consider now a write operation. The next operator in the control stream of information shown in FIG. 5 is a write operator (character ㉖). The write operator specifies that a character is to be taken from the information stream (shown in FIG. 5) and written into the master stream of data (Δ) replacing a character already in the master stream.

Referring in particular to the control stream of information, it will be noted that there are three level control characters of the first level [(*lc*) (1)] up through characters ⑬ and ⑭. Following characters ⑬ and ⑭ there are four level control characters of the second level [(*lc*) (2)] and one level control character of the third level [(*lc*) (3)]. Following the level control characters of the third level characters ㉓ and ㉔, there is a numerical character 2 indicating the field following the second field mark (*fm*) after the level control, of characters ㉓ and ㉔, is the one to be operated on. This program specifies that the field shown at line 15 of the third record of the master stream of data (Δ) is the one to be operated on according to the operator shown at ㉖ in the control stream of information. Accordingly, the character E shown at ① in the information stream is to be inserted at line 15 in the master stream of data (Δ). The character E represents extended type of insurance coverage. As will be explained the E is written into the coverage portion of the master stream of data (Δ) shown at line 15 of the third record.

Consider now the actual operation of the flow processor 200 in the write operation. The *r*1 register 404 is now pointing at the character ⑬ in the control stream of information. Hence the processor starts comparing the level control characters and numerical characters in the control stream of information, beginning with character ⑬. The characters are compared with the master stream of data (Δ) as they flow through the *rr* register 216, and the operation continues similar to that described hereinabove.

Finally, the flow processor 200 arrives at and detects the characters in the master stream of data (Δ) specified at ㉓ and ㉔ in the control stream of information. These, of course, are the level control characters [(*lc*) (3)] shown at line 13 in the third record (see FIG. 4). Subsequently, the *fm* counter 222 counts the following two field mark characters in the master stream of data (Δ) and then forms a signal indicating that the correct field mark has been detected and that the following field shown at line 15 in the third record is to be operated on.

As the character shown at line 15 of the third record is stored into the *rr* register 216, the strobe pulse at the ST (111*a*) output circuit causes the gates 280 and 251 to initiate the read cycle in the main memory 402, causing a character to be read out and stored in the *wr* register 212. The *r*2 register 406 is now pointing at the character ④ in the information stream which is the character E, hence, a character E is now stored in the *wr* register 212. The gate 314 causes the gate 310 to couple the character E from the *wr* register 212 through the gate 308 to the gate 305. The following control pulse at CP (113*a*) causes the character E to be written into the master stream of data (Δ) replacing the coverage character originally in the master stream of data (Δ) shown at line 15 in the third record of FIG. 4. The field mark characters in the master stream of data (Δ) and in the information stream cause the write operation to be terminated, as described hereinabove.

Consider now a compare operation. Characters ㉗, ㉘, ㉙, ㉚, ㉛ and ㉜ in the control stream of information specify that the field at line 18 of the master stream is to be compared against the characters ⑥, ⑦, ⑧, and ⑨ of the information stream. Referring to line 18 of the third record, it will be noted that this field designates the year of the automobile covered by insurance. Referring to characters ⑧ through ⑨ of the information stream, it will be noted that the make being compared against the make listed in the master stream of data (Δ) is 1958. The compare operator at ㉙ in the control stream of information is a COMP=. Therefore, a compare is to take place looking for equality between the information stream and the master stream of data (Δ).

To this end, the flow processor first locates the field designated at line 18 of the third record as described hereinabove and as the first character of the field in the master stream of data (Δ) shown at line 18 is strobed into the *rr* register 216, the strobe pulse at the ST (111*a*) output causes the gates 253, 257 and 251 to initiate a read operation in the main memory 402 and read the "I" character in the information stream. Additionally, the gates 253, 257 and 265 cause the delay circuit 267 to strobe the "I" character from the information register 408 into the *wr* register 212. The compare and gate circuit 298 compares the character against the character stored in the *rr* register 216 and sets the flip-flop 300 in accordance with the table shown in FIG. 3, as described hereinabove.

This operation continues for each character of characters ⑦, ⑧ and ⑨ of the information stream. If, after comparing character ⑨ of the information stream with the last character in the field at line 18 in the master stream of data (Δ) there has been an equality between all of the characters in the field, the flip-flop 300 will be in a true state. If the comparison failed, the flip-flop 300 will be in a false state. An indication of the outcome of the comparison is provided to the main data processor by the flip-flop 300.

Assuming that a (COMP>) or (COMP<) operator were to be executed, the operation would be essentially the same, except for the operation of the compare and gate circuit 298 which would be as set forth in the logical table of FIG. 3.

The read operator is a very important operator as it permits data to be extracted from the master stream of data (Δ) on tape and causes the extracted data to be stored in the memory. Consider the execution of a read operator. If a read operator is stored in the OR register 214, the operation will be very similar to that described hereinabove for other operators. The main difference is the transfer of information after the desired field is located. For example, when the correct field is located, the first character of the field read by the magnetic tape transport 110 causes a strobe pulse at the ST (111*a*) output circuit which causes the gate 259 to apply signals to the gate 262 and to the delay circuit 258. The control signal to the gate 262 causes the character being read from the magnetic tape transport 110 to be stored into the information register 408 and the pulse subsequently formed by the delay circuit 258 causes the character to be written into the address of the magnetic core memory 403 designated by the state of the *r*2 register 406. The *r*2 register 406 is used for addressing the main memory 402, therefore the character is written into the information stream of information. Therefore, at this point in the information stream a blank or unused character should be provided since it will be destroyed by the incoming character.

If a stop operator is stored in the OR register 214, it designates that the magnetic tape transports 110 and 112 are to be stopped. Accordingly, after a field is located and the stop operator is stored in the OR register 214, a control signal is applied from the S output circuit of the OR decoder 268 to the control units 111 and 113 causing the control units to stop the operation of the corresponding magnetic tape transports. An interrupt operator stored in the OR register 214 signals the main data processor 400 that a field in the main stream of data (Δ) has been located, allowing the main data processor to take a prearranged course of operation.

Although the storage device for storing the data to be processed has been described as a tape transport it will be understood the foregoing description that other storage devices may be employed within the scope of the present invention including storage devices such as drums, disks, lazor systems or any other storage devices capable of serially receiving and storing file data and for serially reading out the file data stored in the storage device. It should also be understood that the level control character and associated numerical character designating the level in the file could be combined into a single character with appropriate rearrangement of the circuitry. Additionally, the desired field need not be immediately following the designated field mark but, for example, could be positioned a predetermined distance from the field mark.

One embodiment of this novel invention is shown by way of example. However, it should be understood that there are other arrangements and modifications of the device which are still within the scope of the present invention.

What is claimed is:

1. In a data processing system the combination comprising a bulk storage system having a plurality of fields of data stored therein including at least one unique signal delimiting each of said fields, said bulk storage system including means operative for continuously and sequentially reading out and then restoring a plurality of said fields, memory means for storing a plurality of operators and associated with at least some of said operators a plurality of delimiters arranged in a predetermined order for determining a field for processing, means for causing said memory means to sequentially read out a plurality of said operators and associated delimiters simultaneously with the continuous reading of the fields from said bulk storage device, controllable means for rapidly processing a field of data as it is read out of said bulk storage system and before it is restored in the bulk storage system in accordance with an operator read from the memory means, and means for comparing the delimiters associated with an operator being processed one by one, in said predetermined order with the delimiters read in said fields and for detecting an equality therebetween, said processing means being adapted in response to such detection for performing such processing operation on a field which is read out of said bulk storage system subsequent to the detected delimiter.

2. In a data processing system the combination comprising a bulk storage system having a plurality of fields of data stored therein including at least one unique signal delimiting each of said fields, said bulk storage system being operative for continuously and sequentially reading out a plurality of said fields, memory means for storing a plurality of operators and associated with at least some of said operators a plurality of delimiters arranged in a predetermined order designating a field for processing, means for causing said memory means to sequentially read out a plurality of said operators and associated delimiters in said order simultaneous with the continuous reading of said fields, register means for serially storing the fields of data read out of the bulk storage system, controllable means coupled to said memory means for rapidly processing the fields of data as they are read out of said bulk storage system and stored in the register means in accordance with an operator read from the memory means, and means for comparing delimiters associated with an operator being processed, one by one, in said order with the delimiters read in said fields and for detecting an equality therebetween, said processing means being adapted in response to such detection for performing such processing operation on a field read out of said bulk storage system subsequent to the detected delimiter.

3. In a data processing system the combination comprising a bulk storage system having a plurality of fields, each comprising at least one character signal stored therein including at least one character delimiting said fields, said bulk storage system being operative for continuously and sequentially reading out a plurality of said fields character by character, memory means for storing a plurality of characters including operators and associated with at least some of said operators a plurality of delimiters arranged in a predetermined order for designating a field for processing, means for causing said memory means to sequentially read out a plurality of said operators and associated delimiter characters in a predetermined order simultaneous with the continuous reading of said fields, register means for sequentially storing the field characters read out of said bulk storage means, means adapted for rapidly processing the field characters as they are stored in said register means in accordance with an operator read from the memory means, and means for comparing delimiters associated with such operator, one by one, in said predetermined order with the delimiter characters read in said fields and for detecting an equality therebetween, said processing means being operative in response to such detection for performing such processing operation on a field character stored in said register means subsequent to the detected delimiter character.

4. In a data processing system the combination comprising bulk storage means having a plurality of records therein comprising character signals, each record being delimited by at least one unique level control character and having a plurality of fields each delimited by at least one unique field mark character, said bulk storage means being operative for continuously and sequentially reading out a plurality of said records; and a data processing device comprising memory means for storing a plurality of characters including operators and associated with at least some operators a plurality of delimiters arranged in a predetermined order for designating a record and a field within such record for processing and a field mark number, means for causing said memory means to sequentially read out a plurality of operators and associated delimiters in such order simultaneously with the continuous reading of the characters from said bulk storage means, first register means for storing an operator read out of the memory means and the associated delimiters, one by one, in said order and the corresponding field mark number, register means for sequentially storing the characters read out of said bulk storage means, controllable means for processing the record characters stored in said second register means in accordance with an operator read from the memory means, and means for comparing the delimiters associated with such operator and stored in said first register means, one by one, in said predetermined order with the delimiters read in said records and for detecting an equality therebetween, counting means initiated by said detection for counting the field marks in the fields which are read and for providing a second indication when the number of field marks are read as are indicated by the field mark number associated with the corresponding operand, said processing means being adapted to be responsive to such second detection for performing such processing operation on a record character subsequently stored in said register means.

5. In a data processing system the combination comprising: first and second magnetic tape transports, said first tape transport having a tape with a plurality of data character signals written thereon which are arranged in records having a plurality of types of data, each record being delimited by a level control character and data within each record being delimited by at least one field mark character, transducing means for reading the characters from tape in said first tape transport, said second tape transport including a tape and transducing means for writing characters on tape, control means operative for causing a plurality of records to be continuously read by said first tape transport and subsequently written back onto tape in said second tape transport; and a processor comprising memory means for storing a string of control characters including an operator character for defining an operation to be performed on a data character flowing between tape transports and associated therewith at least one level control character and a number character identifying the record and number of field marks from the identified level control character a data character exists in the data character signals which is to be processed, means for serially reading the control characters out of the memory means in sequence simultaneously with the reading and writing of said tape transports, register means for simultaneously storing an operator and associated level control character and number character in said control characters read from the memory means, means for comparing a stored level control character associated with a stored operator with characters read in said first tape transport and for providing a first indication of a corresponding level control character read from tape, means including a counter operative for counting the field mark characters read from tape subsequent to said first indication, means for comparing the state of said counter with the stored field mark number character associated with the stored operator and operative for providing a second indication in response to a predetermined relationship therebetween, and means responsive to said second indication and said operator for rapidly processing a subsequent data character, flowing between tape transports, as specified by the stored operator.

6. In a data processing system the combination comprising: a magnetic tape transport having a tape with a plurality of data character signals written thereon which signals are arranged in records having a plurality of types of data, each record being delimited by a level control character and data within each record being delimited by at least one field mark character, transducing means for reading the signals from tape, control means operative for causing a plurality of records to be read by said tape transport; and a processor comprising memory means for storing a string of control characters including an operator character for defining an operation to be performed on a data character and associated therewith a level control character and a number character identifying the record and number of field marks from the identified level control character a data character exists which is to be processed, means for reading the control characters out of the memory means in sequence simultaneously with the reading of said tape transport, register means for simultaneously storing an operator and associated level control character and number character in said control characters read from the memory means, means for comparing a stored level control character associated with a stored operator with the characters read from the tape transport and for providing a first indication of a corresponding level control character read from tape, means including a counter adapted for counting the number of field mark characters read from tape subsequent to said first indication, means for comparing the state of said counter with the stored field mark number character and operative for providing a second indication in response to a predetermined relationship therebetween, and means responsive to said second indication and said stored operator for processing a data character subsequently read from tape as specified by such operator.

7. In a data processing system the combination comprising: a bulk storage device including a magnetic recording surface having a plurality of data character signals recorded thereon which are arranged in records having a plurality of types of data, each record being delimited by at least one level control character and data within each record being delimited by at least one field mark character, transducing means for serially reading the characters from the recording surface; and a processor comprising memory means for storing a string of control characters including an operator character for defining an operation to be performed on a data character and associated therewith at least one level control character and a number character identifying the record and number of field marks from the level control character a data character exists which is to be processed, means for reading the control characters out of the memory means in sequence simultaneously with the reading of said bulk storage device, register means for storing the control characters read from the memory means, means for comparing a stored level control character associated with an operator with characters read from the bulk storage device and for detecting a corresponding level control character read from the bulk storage device, means including a counter operative for counting the number of field mark characters read from the bulk storage device subsequent to said detection, means for comparing the stored number character associated with the same operator with said counter and operative for detecting a predetermined correspondence therebetween, and means adapted for processing data character read from the bulk storage device subsequent to the last mentioned detection as specified by such operator.

8. In a data processing system including storage means having a plurality of records stored therein, each record comprising a plurality of data character signals representing a plurality of types of data, the data being delimited by at least one field mark character and each record being delimited by a level control character, the storage means having means for continuously reading out and then re-writing the characters stored therein character by character, the combination comprising register means for serially storing the characters read out of the storage means, memory means for storing and reading out a string of characters in a preselected order including a plurality of operators and associated with at least some of said operators a plurality of level control delimiters designating a record and at least one field mark delimiter designating a field within the record for processing, means for comparing the level control delimiters associated with an operator read out of said memory means in the order in which they are read with the characters sequentially stored in said register means and for detecting an equality therebetween, means operative for monitoring the characters sequentially stored in said register means subsequent to said detection and for detecting the field mark delimiter designated by the field mark delimiter associated with the corresponding operator, and processing means operative for processing at least one data character stored in said register means subsequent to the last mentioned detection.

9. In a data processing system comprising storage means comprising a first recording surface having a plurality of records stored thereon and a second recording surface, each record comprising a plurality of fields of data separated by at least one delimiting signal, the storage means continuously moving said first and second recording surfaces and including transducing means for continuously and serially reading records from the first recording surface and rewriting such records on the second recording surface after they are read, register means for temporarily storing data serially read out of said storage means before it is rewritten, memory means for storing and sequentially reading out a plurality of operators and associated with each of said operators at least one delimiter designating a field mark preceding a field in the data for processing, means for serially storing the operators along with an associated delimiter as they are read out of the memory means, means responsive to the stored delimiter and operative for detecting the field mark in the data stored in the register means specified by such delimiter and processing means operative in response to the detection of a specified field mark for processing the field of data stored in said register means following said detected field mark, in accordance with the stored operator corresponding to the stored delimiter.

10. In a data processing system the combination comprising bulk storage means including a first recording surface having a plurality of fields of data stored thereon including at least one signal delimiting each of said fields and including a second recording surface, the storage means continuously moving said first and second recording surfaces and including transducing means for continuously and serially reading records from the first recording surface and rewriting such records on the second recording surface after they are read, memory means for storing a plurality of operators, means for causing said memory means to sequentially read out a plurality of said operators simultaneously with the continuous reading of the fields from said bulk storage means, means adapted for checking the fields as they are being read out of the bulk storage means and for detecting a predetermined delimiter therein for each of said operators being read, and means coupled to the checking means and adapted for executing an operation designated by each of said operators subsequent to the detection of the corresponding delimiter as the fields of data are continuously read out and rewritten in said bulk storage means.

11. In a data processing system as defined in claim 10 wherein said operators include a transfer operator and wherein said executing means includes means adapted to transfer a field of data to the memory means for storage in response to a transfer operator read from the memory means and upon detection of the corresponding delimiter.

12. In a data processing system as defined in claim 10 wherein said memory means includes information data for insertion into said fields of data and wherein said operators include a write operator, said data processing system additionally comprising means adapted for causing said memory means to read out predetermined inormation data, said execution means comprising circuit means adapted for inserting the information data read out of the memory means into fields being rewritten in response to a write operator and the detection of the predetermined delimiter corresponding to such write operator.

13. In a data processing system as defined in claim 10 additionally comprising a data processor, said operators including an interrupt operator, said executing means including circuit means adapted to provide an interrupt signal to said data processor in response to an interrupt operator read out of the memory means and the detection of the predetermined delimiter corresponding to said interrupt operator.

14. In a data processing system as defined in claim 10 wherein said operators include an arithmetic operator wherein said memory means contains informational data, means for selectively reading said information data out of the memory means, said executing means including an arithmetic means operative in response to an arithmetic operator read out of the memory means and the detection of the predetermined delimiter corresponding to such arithmetic operator for combining the read out information data and the field read out of the bulk storage device subsequent to the detected delimiter, in accordance with such operator, said executing means additionally being adapted for forming a corresponding modified field, said processing system additionally comprising means adapted for inserting the modified field into the fields being rewritten.

15. In a data processing system the combination comprising a bulk storage system comprising a first recording surface having a plurality of fields stored thereon and including a second recording surface, each field comprising at least one character signal therein including at least one character delimiting said fields, the storage means continuously moving said first and second recording surfaces and including transducing means for continuously and serially reading records from the first recording surface and rewriting such records on the second recording surface after they are read, memory means for storing a plurality of characters including operators and associated with each operator at least one delimiter designating a field for processing, said memory means additionally storing a series of data characters which are individually associated with preselected character signals in said bulk storage system, means for causing said memory means to sequentially read out a plurality of said operators and associated delimiters simultaneous with the continuous reading of said fields, means for selectively causing said memory means to read out said data characters first, register means for storing the data characters which are read from the memory means, second register means for sequentially storing the field characters read out of said bulk storage means, means adapted for selectively and rapidly combining the field characters as they are stored in said first register means with a data character stored in the second register means in accordance with an operator read from the memory means, and means for detecting the delimiter character in said fields which is designated by the delimiter associated with such operator, said combining means being operative in response to such detection for performing such combining operation on a character as it is read and rewritten and thereby combine a field character stored in said register means subsequent to the detected delimiter character.

16. Data processing apparatus for rapidly processing a master stream of data as it is serially and continuously passed from one storage device to another, the data being arranged into records which are further divided into sub-groups of data, the same level control character preceding each record and additional different level control characters which are the same from one record to the next preceding the sub-groups of data, comprising memory means for storing and reading out a control stream of data including level control and additional level control characters arranged to identify records and sub-groups of data to be processed and operator characters, first register means for temporarily storing data in the master stream of data as it is passed from one storage device to the other, controllable processing means for processing the master stream of data as it passes through the first register means in accordance with the operators read from the memory means, second register means for storing the level control and additional level control characters read from the memory means, means for comparing a level control character and upon detecting an equality comparing an additional level control character stored in the second register means with the master stream of data stored in the first register means and upon detecting an equality of the additional level control character initiating the processing by the processing means causing the data in the master stream of data following the detected equality of the additional level control character to be processed as it passes from one storage device to the other.

17. Data processing apparatus for rapidly processing a master stream of data as it is serially and continuously passed from one storage device to another, the data being arranged into records which are further divided into sub-groups of data, the same level control character preceding each record and additional different level control characters which are the same from one record to the next preceding the sub-groups of data, comprising memory means for storing and reading out a control stream of data including level control and additional level control characters arranged to identify sub-groups of data to be processed and operator characters, first register means for temporarily storing data in the master stream of data as it is passed from one storage device to the other, controllable processing means for processing the master stream of data as it passes through the first register means in accordance with the operators read from the memory means, second register means for storing the level control and additional level control characters read from the memory means, means for comparing a level control character stored in said second register means with the master stream of data stored in said first register means and upon detecting an equality causing an additional level control character to be read out of the memory means and stored in the second register means, the compare means being operative for comparing an additional level control character with the master stream of data stored in said first register means with the master stream of data stored in the first register means and upon detecting an equality of the additional level control character initiating the processing by the processing means causing the data in the master stream of data following the detected equality of the additional level control character to be processed as it passes from one storage device to the other.

18. Data processing apparatus for rapidly processing a master stream of data as it is serially and continuously passed from one storage device to another, the data being divided into records and sub-records by individual and different level control characters, comprising memory means for storing and serially providing a plurality of operators and associated with each operator one or more of said level control characters arranged in a predetermined order, processing means responsive to a control signal for processing a portion of the master stream of data in accordance with an operator in the master stream of data and means for serially comparing the level control characters received from the memory means in the order provided with the level control characters in the master stream of data in the order provided and upon detecting an equality therebetween providing a control signal to the processing means thereby initiating the processing thereby on the subsequent data received in the master stream of data.

19. Data processing apparatus for rapidly processing a master stream of data as it is serially and continuously passed from one storage device to another, the data being divided into records and sub-records by individual and different level control characters, comprising memory means for storing and serially providing a plurality of operators and associated with each operator one or more level control characters arranged in a predetermined order, first and second register means, respectively, for storing the operators and level control characters, one by one, in the order read from the memory means, third register means for temporarily storing a segment of the master stream of data as it is passed from one storage device to the other, processing means responsive to a control signal for processing a portion of the master stream of data subsequently stored in the third register means in accordance with an operator stored in the first register means and means for serially comparing level control characters stored in the second register means in the order stored with the level control characters in the master stream of data in the order stored in the third register means and upon detecting an equality with all level control characters associated with the operator being processed providing a control signal to the processing means initiating the processing thereby on the subsequent data stored in the third register means.

References Cited

UNITED STATES PATENTS

| | | | |
|---|---|---|---|
| 2,996,699 | 8/1961 | Kramskoy | 340—172.5 |
| 3,235,848 | 2/1966 | King et al. | 340—172.5 |
| 3,307,153 | 2/1967 | Bauer | 340—172.5 |

ROBERT C. BAILEY, *Primary Examiner.*

R. M. RICKERT, *Assistant Examiner.*

UNITED STATES PATENT OFFICE
CERTIFICATE OF CORRECTION

Patent No. 3,354,429 November 21, 1967

Charles E. Macon et al.

It is hereby certified that error appears in the above numbered patent requiring correction and that the said Letters Patent should read as corrected below.

Column 2, line 11, for "increase" read -- increased --; line 34, for "processng" read -- processing --; column 6, line 31, for "CO" read -- PCO --; line 33, for "circle" read -- circuit --; line 39, before "signal" insert -- control --; column 7, line 23, strike out "address", third occurrence; column 9, line 44, for "getween" read -- between --; line 48, for "22" read -- 222 --; column 12, line 2, for "these" read -- three --; line 37, for "addresses" read -- address --; column 14, line 59, for "te" read -- the --; column 15, line 2, for "PC14" read -- PC14$\ell$ --; column 21, line 12, after "understood" insert -- from --; column 25, line 39, for "inormation" read -- information --.

Signed and sealed this 14th day of January 1969.

(SEAL)
Attest:

EDWARD M.FLETCHER,JR.
Attesting Officer

EDWARD J. BRENNER
Commissioner of Patents